United States Patent [19]
Szecket

[11] Patent Number: 5,961,027
[45] Date of Patent: Oct. 5, 1999

[54] METHOD OF PRODUCING HIGH ENERGY CONTOURED HERMETIC SEAL

[75] Inventor: Alexander Szecket, Toronto, Canada

[73] Assignee: Sigma Technologies Corporation, Toronto, Canada

[21] Appl. No.: 08/880,803

[22] Filed: Jun. 23, 1997

[51] Int. Cl.$^6$ .................................................. B23K 20/08
[52] U.S. Cl. ........................................... 228/107; 228/109
[58] Field of Search .................................... 228/107, 108, 228/109, 2.5

[56] References Cited

U.S. PATENT DOCUMENTS

| | | |
|---|---|---|
| 4,095,734 | 6/1978 | Persson . |
| 4,272,005 | 6/1981 | Jackson et al. .......................... 228/107 |
| 4,747,350 | 5/1988 | Szecket . |
| 4,842,182 | 6/1989 | Szecket . |
| 4,901,905 | 2/1990 | Persson .................................. 228/107 |
| 5,279,169 | 1/1994 | Freeman . |
| 5,318,213 | 6/1994 | Stickland et al. ....................... 228/107 |
| 5,392,661 | 2/1995 | Freeman . |
| 5,435,058 | 7/1995 | Breit et al. ................................ 29/854 |
| 5,470,013 | 11/1995 | Persson .................................... 228/108 |

OTHER PUBLICATIONS

Bement, Laurence; "Practical Small–Scale Explosive Seam Welding", NASA Technical Memorandum 84649, 1983.

*Primary Examiner*—Patrick Ryan
*Assistant Examiner*—Carlos J. Gamino
*Attorney, Agent, or Firm*—Pillsbury Madison & Sutro, LLP

[57] ABSTRACT

A method of producing an hermetically sealed bond between a first metal and a second metal wherein the first metal comprises a first portion and a second portion, the method comprising (a) positioning the second portion and the second metal in generally spaced apart parallel relation; and (b) propelling the first portion into collision with the second metal so as to produce the hermetically sealed bond between the first portion and the second metal. The propulsion is preferably effected by a high velocity explosive charge of 5,500–9,000 m/s. The improved resultant bond is hermetically sealed. The process is of value in providing an hermetically sealed chamber, cavity or envelope having improved sealed properties.

8 Claims, 6 Drawing Sheets

METHOD OF PRODUCING HIGH ENERGY CONTOURED HERMETIC SEAL

FIELD OF THE INVENTION

This invention relates to methods for the metallurgical bonding of metals to one another to produce a hermetic seal therebetween, particularly to explosive bonding, and more particularly to said methods to produce a hermetically sealed envelope or chamber between the metals; and to bonded articles made thereby.

BACKGROUND TO THE INVENTION

It is well-known that when ferrous metals are exposed to water and corrode that hydrogen atoms are liberated at a rate corresponding to the rate of corrosion activity as a result of the dissociation of water molecules into hydrogen atoms and hydroxyl groups. Some of these hydrogen atoms permeate and migrate through the ferrous metal body. When such atoms resurface they combine to form molecular hydrogen gas and then dissipate.

Various systems have sought to exploit the solubility and dissipation of atomic hydrogen as a means of monitoring the corresponding magnitude of corrosion activity.

U.S. Pat. No. 5,279,169, issued Jan. 18, 1994, and U.S. Pat. No. 5,392,661, issued Feb. 28, 1995, to H. Bruce Freeman, and references cited therein relate to methods for monitoring the magnitude of corrosion occurring at a surface of a ferrous metal body when exposed to a corrosive material, such as water.

Solid phase welding is a method of welding metals by the application of pressure so as to produce interfacial plastic deformation of the metals at the interfacial surfaces which breaks up the contaminant surface films to expose virgin contact surfaces for bonding.

A solid phase weld may be achieved by a process identified as "impact welding" which consists of driving or propelling one metal layer against another metal layer at a sufficient velocity and at an oblique impact so as to cause bonding of the two metal layers together at the common interfacial region of contact. Impact Welding has been achieved by those skilled in the art by utilizing magnetic propulsion equipment, gas guns and explosives to propel the metal layers together. If the metals are driven together by means of explosion, the process is known as explosion welding. Reference is made to U.S. Pat. No. 4,747,350, issued May 31, 1988, and U.S. Pat. No. 4,842,182, issued Jun. 27, 1989, to Alexander Szecket, for a further explanation.

In explosion welding, metal plates or layers which are to be welded are spaced apart relative to one another in either generally parallel relation or inclined relation and a layer of suitable explosive charge disposed on one of the metal layers is detonated so as to impart kinetic energy to the "flyer" plate causing the flyer plate to collide obliquely with the stationary "parent" plate. The explosive, while detonating, produces a force normal to the flyer plate causing the flyer plate to impact the parent plate obliquely at a collision or impact angle. As the detonation proceeds along the flyer plate, it progressively drives the flyer plate along the parent plate at a particular welding velocity. If two metal layers are to be bonded the explosive charge may be disposed on both metal layers.

U.S. Pat. Nos. 3,728,780 and 3,137,937 generally relate to explosion welding, which may be utilized to weld different metals together.

U.S. Pat. No. 3,813,758 teaches that a metal jet is formed at the point of impact between the flyer plate and parent plate. It is believed that this jet which contains the contaminant surface layers of both plates is forced outwardly at a high velocity during the explosion welding process. This cleaning operation allows a solid phase weld to be formed between the interfacial clean metallic surfaces of the plates under the intense local pressure in the region of contact.

U.S. Pat. No. 3,583,062 discloses that three types of bonded zones may result from explosion welding, viz;
(a) a direct metal to metal bond (with a straight interface);
(b) a uniform melted layer in which the metals are bonded together with an intervening layer of solidified melt substantially homogeneous composition; and
(c) a wavy type of bond zone comprised of periodically spaced discreet regions of solidified melt, between areas of direct metal to metal bond.

Moreover, U.S. Pat. No. 3,397,444 generally teaches that products having the wavy type bond interface are preferred in many situations because of their normally higher strength, and defines values of parameters such as collision velocity so as to produce the preferred wavy interface.

Similarly, U.S. Pat. No. 3,583,062 states that the wavy bond zone is preferred over the substantially straight bond because of the larger interfacial area the wavy bond provides, and also defines the value of certain parameters which will produce the preferred wavy interface.

However for metal combinations tending to form brittle intermetallics, the melt associated with the bonded wavy interface presents zones of weakness. Metal combinations which tend to form brittle combinations are well known to those skilled in the art and generally encompass those metal combinations which have a wide dissimilarity between the densities of the metals to be bonded, which include for example, aluminum to steel, aluminum to copper, zirconium to steel, tantalum to steel, titanium to steel, titanium to copper, and their respective alloys.

Brittle intermetallics are diffusion products, and are undesirable, particularly when the welded zone is subjected to an increase in temperature which enhances diffusion.

Aforesaid U.S. Pat. Nos. 5,279,169 and 5,392,661 describe in broad aspects a corrosion monitor for monitoring the corrosion of a non-porous steel body by measuring the diffusion of hydrogen atoms through a selected area of the body from a second surface to an opposite first surface thereof, comprising:

(a) a chamber-defining member;
(b) seal means extending around the marginal perimeter of the chamber-defining member for sealably securing the chamber-defining member to the first surface so as to define with said selected area of the first surface of the non-porous steel body a sealed chamber which is impervious to the flow of gas or liquid;
(c) said chamber defining member being adapted to closely conform to the surface shape of said selected area and to lie in close proximity thereto, said chamber defining member comprising an element which is sufficiently flexible that it deflects toward, and comes to rest upon, the first surface of the body upon evacuation of the chamber so as to reduce the volume of the chamber and define a fixed interstitial volume of the chamber throughout an optimal vacuum pressure operating range;
(d) means for connecting an evacuating means to the chamber defining member to permit substantial evacuation of the contents of the chamber to establish a partial vacuum therein;

(e) means for isolating the chamber from the evacuation means after the partial vacuum has been established to maintain the partial vacuum in the chamber so that hydrogen atoms that are generated as a result of corrosion of the second surface of the body and which diffuse through the non-porous material of the body and which exit the first surface within the chamber and which combine to form hydrogen molecules, collect in the chamber thus resulting in a decay of the vacuum in the chamber; and (f) vacuum monitoring means for monitoring the decay of the vacuum in the chamber over time to give an indication of the rate of diffusion of hydrogen atoms through the selected area of the non-porous steel body and hence an indication of the rate of corrosion of said second surface.

However, it is known that applications that require a precisely defined sealed space particularly between dissimilar metals are limited by the means by which the two metals may be attached.

In the case of applications such as disclosed in aforesaid U.S. Pat. Nos. 5,279,169 and 5,392,661 having specific vacuum requirements, for example, an epoxy resin is used to attach, for example, a 0.1 mm thickness stainless steel foil to a cylindrical carbon steel pipe of requisite dimension. Unfortunately, this method of attachment is temporary and does not provide a reliable seal particularly under extreme cold weather conditions and temperature fluctuations. Further, in some circumstances, the resins used may produce harmful vapors that may preclude their use entirely.

In the case of pressure containment requirements, welding alternatives, such as fusion or arc welding, or any temperature related bonding technologies create heat affected zones in the underlying metallic structure and, thereby, introduce metallurgical weaknesses which may damage the metal in such a way as to make the welding alternative impossible.

In the case of impact bonding produced either by explosives, compressed gas or electromagnetic discharge, a high pressure low temperature contact is created between a planar flyer plate and a planar base plate such that the two surfaces meet at a precise angle and velocity and a metallurgical bond is achieved between them.

However, there remains a need to provide a suitable metallurgical bond between metals which is sufficiently hermetic as to, for example, provide a satisfactory product as required in the apparatus and utility described in aforesaid U.S. Pat. Nos. 5,279,169 and 5,392,661 in the determination of the magnitude of corrosion at the surface of a ferrous metal body.

SUMMARY OF THE INVENTION

It is a principle object of the present invention to provide an improved method of metallurgically bonding metal layers together in an easy, quick, inexpensive and reliable manner to provide a metallurgical bond which is insensitive to pressure, humidity, water, oil, ambient contamination, vibration and variations in temperature.

It is a further object of the invention to provide an improved method of producing said metallurgical bond by impact welding, particularly, explosive bonding.

It is a yet further object of the invention to provide bonded metal layers having improved hermetically sealed chamber or envelope defined therebetween, and products made therewith.

The present invention provides a method which enables the attachment of any suitable metallic plate, thin sheet, foil and the like, particularly by an explosive discharge to any suitable metallic substrate structure via an impact weld. I have disclosed that the underlying metallic structure is not stressed by temperature during the bonding process and that heat affected zones and other associated metallurgical disadvantages are avoided. In the case of steel structures where the thickness of the underlying steel is 6 mm or greater the shock hardening effect is negligible. The velocity of the explosive used, the shape of the detonation pathway, and the relative configuration of the foil towards the substrate are significant factors in the manufacture of preferred products according to the invention.

The method according to the invention of attaching a thin plate foil and the like of a similar or dissimilar metal to a suitable metal, e.g. a steel substrate can be used with satisfactory versatility on pipes, storage tanks, process vessels, columns in petrochemical industries, gas plants, nuclear plants, waterfloods, steam and hot water systems, hermetic isolation of potentially hazardous samples and the like to create a permanent bond between the two mating surfaces conforming the envelope. Generally, the strength of the bond will exceed the weaker metal. Examples of metals that can be joined in this manner in any combination, include copper, nickel, titanium, zirconium, aluminum and alloys thereof, stainless steels, carbon steels from low carbon mild 1010 to high carbon 516 Gr 70.

Since impact bonding is a solid-phase welding process suitable to bond together widely dissimilar metals and alloys regardless of differences in melting points, lattice parameters, densities, crystallographic miss-orientation and even hardnesses, it can be applied equally reliably on any combination of steels. For example, all stainless steels of the series 300 and 400 can be bonded to all grades of carbon steels for pipe or vessels applications.

The present invention provides a method of making a high energy contoured hermetic seal which enables the permanent attachment of a metallic foil and the like to the outside surface of a steel pipe or other metallic structure. The foil is attached, preferably, by means of an explosive discharge arranged in a precise configuration. The seal creates a permanent perimetrical bond contour having a defined outer boundary and a hermetically sealed inner cavity. In one application the invention provides an hermetically sealed envelope between either similar or dissimilar metals to create an isolated enclosed space or envelope between the foil and the substrate pipe surface. The resultant bond or method does not alter the metallurgical characteristics of the substrate metal. This enclosed space is capable of holding vacuum or containing pressures up to the shear strength of the foil used.

Accordingly, in one broad aspect, the invention provides a method of producing an hermetically sealed bond between a first metal and a second metal wherein said first metal comprises a first portion and a second portion, said method comprising:

(a) positioning said second portion and said second metal in generally spaced apart parallel relation;

(b) propelling said first portion into collision with said second metal so as to produce said hermetically sealed bond between said first portion and said second metal.

In a further broad aspect the invention provides a method of producing an hermetically-sealed bond between a first metal and a second metal wherein said first metal comprises a first portion and a second portion, said method comprising:

(a) positioning said second portion and said second metal in generally spaced apart parallel relation;

(b) applying a layer of high velocity explosive charge having a velocity selected from 5,500–9,000 m/s upon said first portion;

(c) detonating said explosive charge so as to propel said first portion into collision with said second metal so as to produce said hermetically sealed bond between said first portion and said second metal.

I have most surprisingly found that a high detonation velocity explosive where the velocity of detonation is supersonic relative to the metals involved, prevents a bond from occurring along the length and in the center of the explosive pathway. However, I have found that a most desirable double weld is achieved at an angle on both sides of the vertex or point of impact. A pre-set collision angle of preferably 3–30° between the substrate and a portion of the foil as hereinafter described is efficacious in triggering the optimal collision angle, depending on foil density and thickness, so as to ensure a resultant high quality double weld bond. In an alternative embodiment a uniform stand-off distance of that portion of the foil to be deformed by propulsion to the substrate without a V-type groove has a similar beneficial result.

Without being bound by theory, the phenomenon to note, hereindefined as perimetrical explosive bonding, is that the detonation velocity, along the pathway, is supersonic and the pathway of explosive discharge does not directly achieve a bond. Rather, the jetting effect which takes place as a result of the continuous angular collision along the explosive pathway, is in a direction approximately 60 degrees from the direction of the pathway. This sideways pattern of jetting is possible only at a slower welding velocity than the detonation velocity along the pathway and is actually subsonic relative to the metals involved. This is where the welding action occurs. The result of this phenomenon is a double bond, one on each side of the non-bonded center of travel.

The perimetrical explosive bond as herein described differs from explosive cladding, explosive seam and lap welding in the following aspects.

(a) Perimetrical explosive bonding differs from cladding in the collision mechanism and in the explosives used. The collision mechanism in cladding takes place in the direction of detonation, whereas in perimetrical bonding it occurs at 60–70 degrees to that direction at both sides of the pathway of detonation to provide a "double zipper" effect.

(b) Perimetrical explosion bonding differs from seam and lap welding in the nature of the high detonation explosives used and the use of a "V" shaped groove or equivalent arrangement for a stand-off uniformity and subsonic collision—an essential requirement for jet formation. Explosive cladding requires low detonation velocity explosives (1700–3700 m/s), while explosive seam or lap welding use an RDX high detonation velocity lead sheathed ribbon (8600 m/s). The high detonation velocity of use in the present invention comes from e.g. a PETN strip (6800 m/s) that is not lead-sheathed, and, thus does not present upon detonation, an environmental disadvantage.

Thus, in the present invention, detonation of the explosive produces the double-weld bond as hereinabove described along the length of each propagation path.

The practice of the method of the present invention in several preferments is described generally as follows.

A narrow continuous strip of high velocity e.g. PETN-based explosive, (6,800 m/s) in the shape of an oval ring is attached to, for example, a rectangular piece of stainless steel foil by means of an adhesive. A short segment of B-line detonation cord and a detonator are attached to one end of the oval shaped explosive loop and is used to detonate the strip. The oval ring is oriented such that the essential longer sides and, hence, the travel of the epicenter of the explosive fronts are longitudinal of the length of the substrate, e.g. pipe.

A uniform stand-off distance is imposed between the pipe surface and the foil, by means, for example, of a 0.8 mm thick piece of Lexan or other suitable inert material. This separator (stand-off) piece is cut to a shape similar to but larger than the explosive oval ring in order to provide a uniform stand-off and contour for the foil to adopt when impacted by the explosive. This separator piece is, generally, attached to the foil by means of adhesive.

In an alternative embodiment the uniform stand-off distance may also be provided by stamping a "V"-shaped groove directly onto the foil precisely in the same contour configuration and directly under the explosive ring. The vertex of this relatively large angled "V" is then positioned in direct contact with the pipe surface to be welded.

Typically, the pipe surface is first cleaned by means of a simple hand grinder to remove surface scale, oxides and grease, and then, all surfaces to be joined are, generally, hand-cleaned with a solvent, e.g. acetone to remove any remaining traces of contamination.

The foil assembly is attached to the outer surface of the pipe circumference by means of any simple clamping arrangement so that the foil is at a uniform distance from the pipe surface at all points along its surface. Metal packing straps or fiber straps are equally effective. Two small pieces of angle iron, placed on each side of the explosive ring may also assist in achieving uniform adhesion.

Thus, I have discovered that the perimetrical explosive bond is of use in creating a hermetically sealed, metallurgically-bonded envelope cavity, chamber and the like.

Accordingly, the invention provides in a further aspect a method of producing an hermetically sealed envelope or chamber between a first metal and a second metal, said first metal comprising a first portion and a second portion, wherein said first portion has a surface defining a closed loop; said method comprising (a) positioning said second portion and said second metal in generally spaced apart relation;

(b) propelling said first portion into collision with said second metal so as to produce said hermetically sealed envelope or chamber between said first portion and said second metal.

Preferably the propulsion is effected by high explosive having a velocity selected from 5,500–9,000 m/s, preferably, about 6,800 m/s.

The practice of the invention is of particular value in providing a hermetically sealed bond around the periphery of a chamber of an apparatus for measuring the diffusion of hydrogen atoms through the metal of, for example, a ferrous pipe, tank or other storage units subject to corrosion.

Accordingly, in a further aspect the invention provides a corrosion monitor for monitoring the corrosion of a non-porous steel body by measuring the diffusion of hydrogen atoms through a selected area of the body from a second surface to an opposite first surface thereof, comprising:

(a) a chamber-defining member;

(b) seal means extending around the marginal perimeter of the chamber-defining member for sealably securing the chamber-defining member to the first surface so as to define with said selected area of the first surface of the non-porous steel body a sealed chamber which is impervious to the flow of gas or liquid;

(c) said chamber defining member being adapted to closely conform to the surface shape of said selected area and to lie in close proximity thereto, said chamber defining member comprising an element which is sufficiently flexible that it deflects toward, and comes to rest upon, the first surface of the body upon evacuation of the chamber so as to reduce the volume of the chamber and define a fixed interstitial volume of the chamber throughout an optimal vacuum pressure operating range;

(d) means for connecting an evacuating means to the chamber defining member to permit substantial evacuation of the contents of the chamber to establish a partial vacuum therein;

(e) means for isolating the chamber from the evacuation means after the partial vacuum has been established to maintain the partial vacuum in the chamber so that hydrogen atoms that are generated as a result of corrosion of the second surface of the body and which diffuse through the non-porous material of the body and which exit the first surface within the chamber and which combine to form hydrogen molecules, collect in the chamber thus resulting in a decay of the vacuum in the chamber; and (f) vacuum monitoring means for monitoring the decay of the vacuum in the chamber over time to give an indication of the rate of diffusion of hydrogen atoms through the selected area of the non-porous steel body and hence an indication of the rate of corrosion of said second surface;

the improvement comprising wherein said chamber-defining member has a first portion having a high energy contoured hermetic seal with said first surface of said body made by a method as hereinabove defined.

In a further aspect, the invention provides a system for monitoring the corrosion of a steel body by measuring the diffusion of hydrogen atoms through a selected area of the body from a second surface to an opposite first surface thereof, comprising:

(a) a chamber-defining member;

(b) a steel body in which at least said selected area is impervious to the flow of gases or liquids;

(c) seal means extending around the marginal perimeter of the chamber-defining member for sealably securing the chamber-defining member to the first surface so as to define with said selected area of the first surface of the body a sealed chamber which is impervious to the flow of gases or liquids;

(d) said chamber defining member being adapted to conform closely to the surface shape of said selected area of the first surface so as to lie in close proximity thereto to minimize the volume of the sealed chamber defined between the selected area of the first surface and the chamber-defining member;

(e) means for connecting an evacuating means to the chamber defining member to permit substantial evacuation of the contents of the chamber to establish a partial vacuum therein;

(f) valve means for isolating the chamber from the evacuation means after the partial vacuum has been established to maintain the partial vacuum in the chamber so that hydrogen atoms that are generated as a result of corrosion of the second surface of the body and which diffuse through the material of the body and which exit the first surface within the chamber and which combine to form hydrogen gas molecules, collect in the chamber thus resulting in a decay of the vacuum in the chamber; and (g) vacuum monitoring means for monitoring the decay of the vacuum in the chamber over time to give an indication of the rate of diffusion of hydrogen atoms through the material of the body and hence an indication of the rate of corrosion of said second surface;

the improvement comprising wherein said chamber defining member has a first portion having a high energy contoured hermetic seal with said first surface of said body made by a method as hereinabove defined.

Preferably, the chamber defining member is formed of a corrosion resistant material.

BRIEF DESCRIPTION OF THE DRAWINGS

In order that the invention may be better understood, preferred embodiments will now be described by way of example only with reference to the accompanying drawings wherein.

DETAILED DESCRIPTION OF PREFERRED EMBODIMENTS

Figure 1:
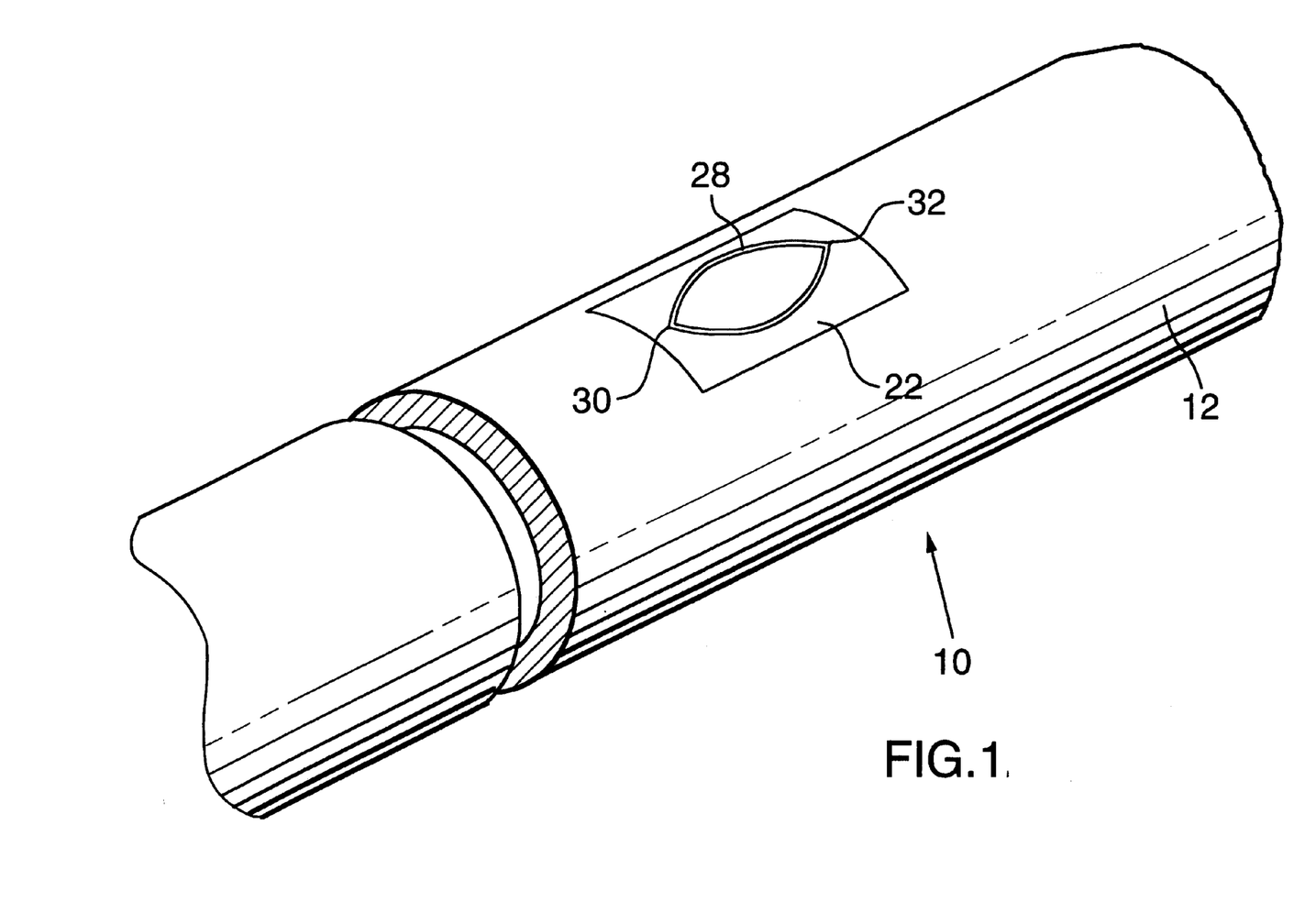
FIG. 1 is a simplified schematic perspective view of a hermatically-sealed metallurgically-bonded envelope embodiment according to the invention.
Figure 2:
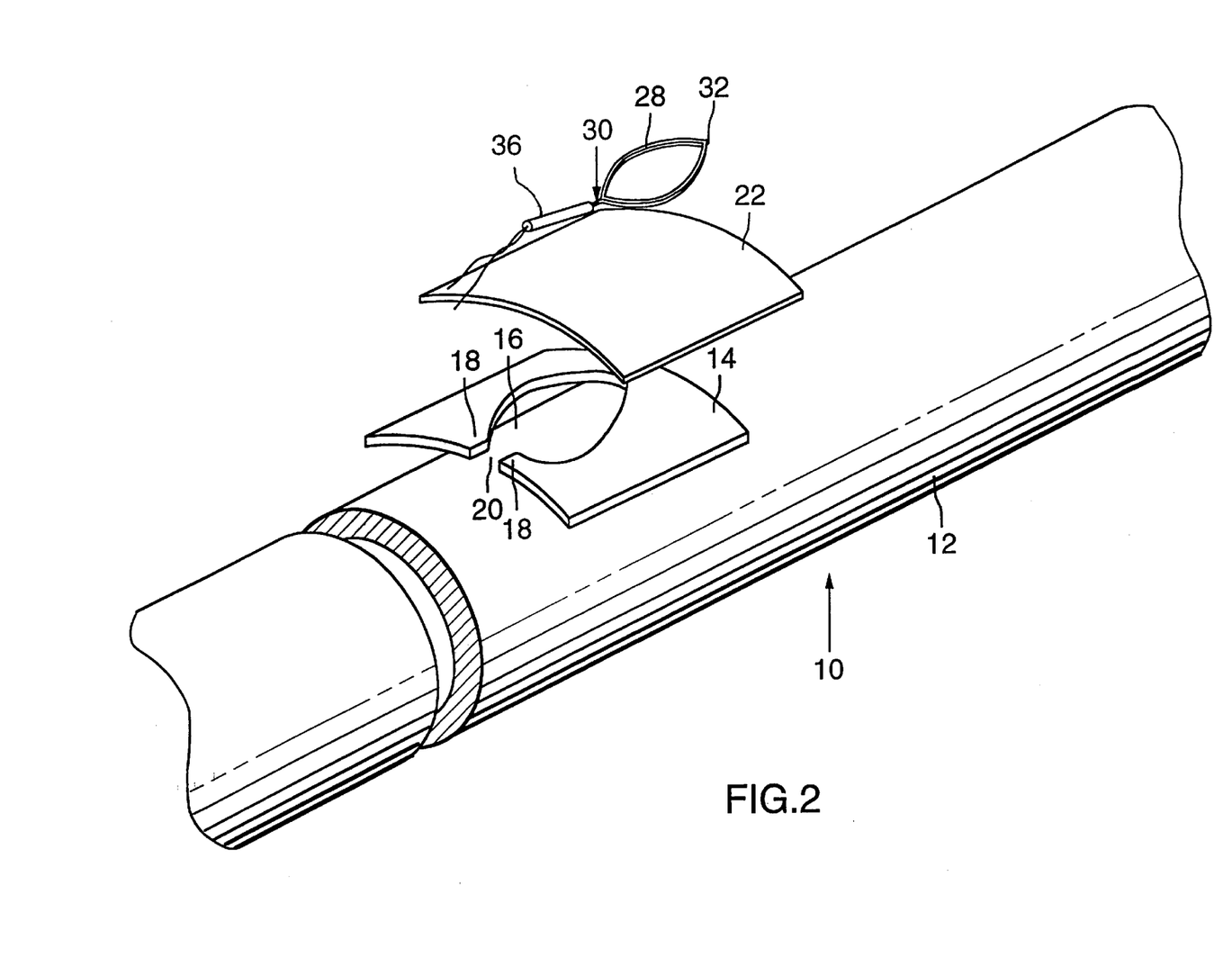
FIG. 2 is a schematic perspective view of the assembled major components including a stand-off plate of use in the method according to the invention.

FIGS. 1 and 2 show generally as 10, a natural gas 30 cm I.D. pipe substrate 12 formed of carbon steel, upon which is placed a stand-off sheet 14 formed of a LEXAN™, thickness 0.8 mm, resiliently flexible plastics material having the same external dimensions as foil 22 of, approximately, 20 cm×15 cm×1 mm.

Sheet 14 has an ellipse or oval-shaped aperture 16 having its longitudinal axis extending axially of the longitudinal axis of pipe 12, and neck portions 18 defining an opening 20. The cut out allows free entry of the explosive front upon impact and subsequent easy retrieval of the stand-off after detonation and bonding. This stand-off separator layer serves to ensure a uniform stand-off distance between the foil and the substrate so that the foil will adopt a uniform and ideal angle of impact towards the substrate when impacted by the explosive force. A spray adhesive is applied to one surface of the Lexan and it is centered and attached to the clean side of the metallic foil. The explosive contoured piece is attached to the opposite side of the foil also by means of the same adhesive. After the dynamic bonding has taken place, the LEXAN film is removed from under the foil edges. Layered above sheet 14 is a rectangularly shaped foil 22 having dimensions 20 cm×15 cm×0.4 mm and formed of 304 L annealed stainless steel. Foil 22 is 0.4 mm thick in the embodiment shown, but may range from about 0.1 mm to about 1.5 mm, in alternative embodiments. Thicker foils may become limited in their bendability and, thus, are restricted to much wider diameter pipe or flatter substrate applications. Fully annealed 304 L type stainless steels having low carbon content perform well in both ductility and weldability. Fully hard 302 type steels, although possessing springback also provide good bonding. As shown better in FIG. 4, foil 22 rests at its periphery 24 on stand-off 14 at inside portions 26 defining aperture, as in FIG. 2, 16 and portions 18.

Figure 3:
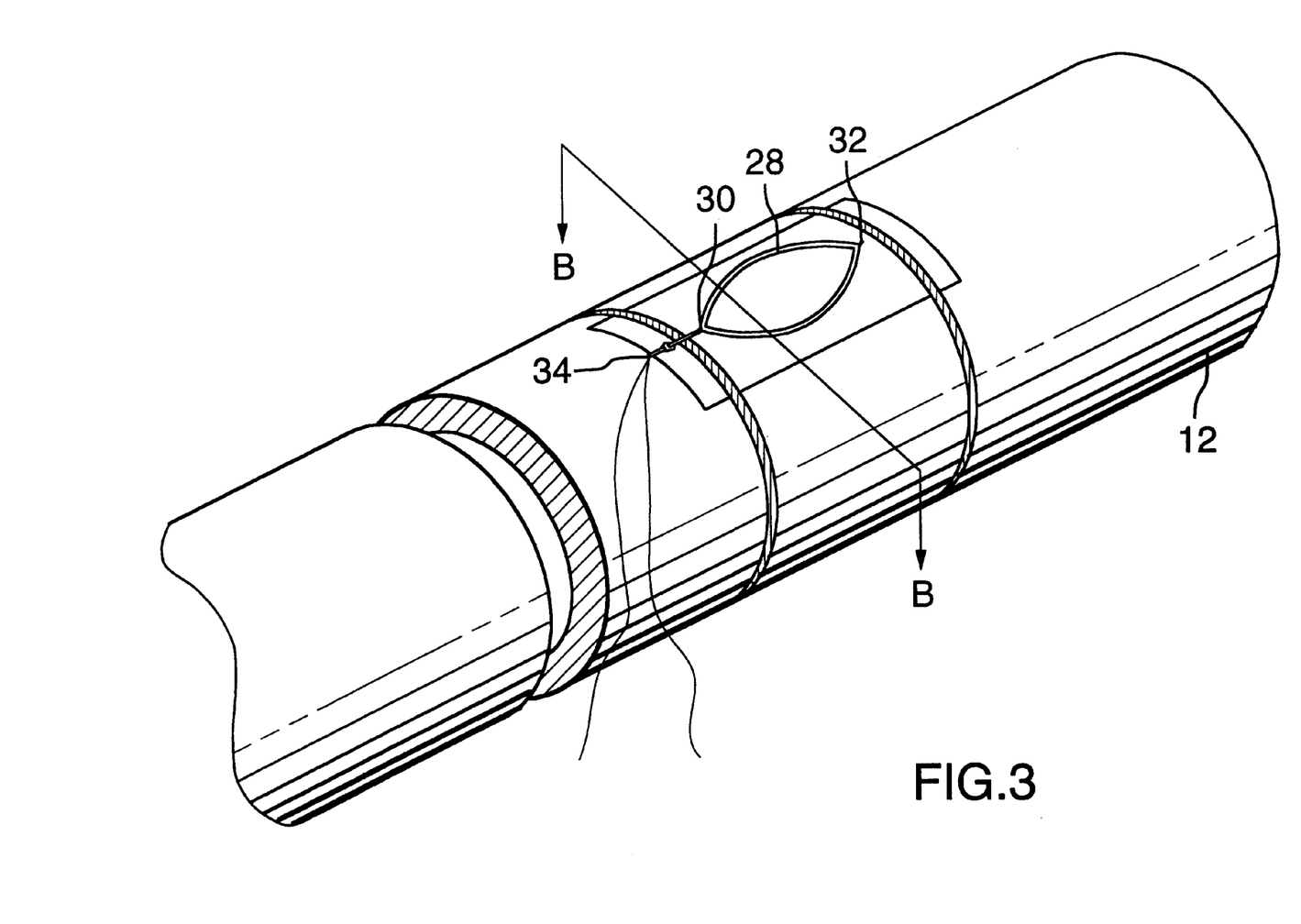
FIG. 3 is a schematic perspective view of the embodiment of FIG. 2 wherein the major components are strapped together, prior to detonation.

The foil assembly, shown in FIG. 2, consists of the three layers, namely, the explosive contour ring, the metallic foil, and the LEXAN separator layer. These layers are attached consecutively to the outer surface of the pipe substrate by any means which will provide firm contact between the surfaces to be bonded. Metallic, fibre, or plastic strapping used for packaging or tie-down applications are suitable as shown in FIG. 3. The strapping is applied to the foil in a manner that achieves good contact while not obscuring the explosive pathway.

Adhered to foil 22 by an adhesive (not shown) is a narrow continuous strip 28 of PETN-based high velocity (6800 m/s) explosive e.g. Primasheet or Detasheet following a path in the shape of a general ellipse having opposed extension portions 30 and 32 extending along the greater axis of the ellipse. The oval-shaped explosive strip 28 throughout the oval pathway is about 3.5 mm wide and 0.86 mm thick and follows the general outline of aperture 16 but disposed adjacent inwardly of portions 24. An area approximately 1 cm wide is left between the outside edge of the explosive contour and the inside cut-out area in the Lexan sheet. A short segment of B-line detonation cord 34 having a detonator #8 36 are attached to end portion 30 and used to detonate strip 28. Strip 28 is laid out such that the longer sides of the oval and, hence, the travel of the epicenter of the explosive front are longitudinal of the length of pipe 12. Thus, stand-off 14 provides a uniform stand-off distance and contour for the foil to adopt when impacted by the explosive. Once the foil assembly is strapped in place, an electric detonator #8 is attached to the detonation cord by means of masking tape or equivalent. The terminal wires of the detonator are hooked to a bi-filar electric cable which, in turn, leads to an explosor, a 12 Volt battery or an electric outlet. When applied, the detonator initiates the explosive charge and the explosive pathway discharges in a precisely defined contour and impacts the foil upon the substrate in a manner which achieves a hermetic seal between the two metals.

Figure 4:
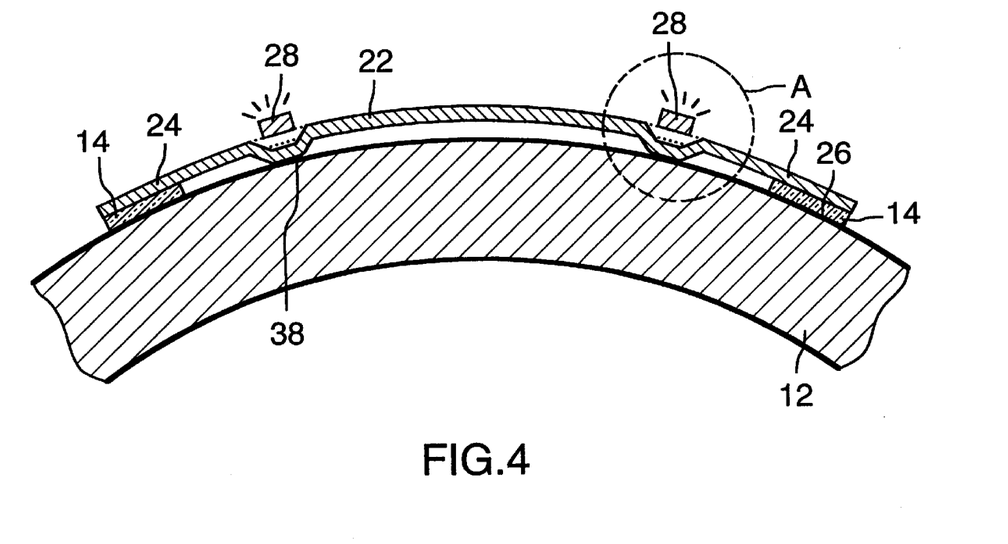
FIG. 4 represents a cross-sectional portion of the line B—B of FIG. 3, during detonation.
Figure 5:
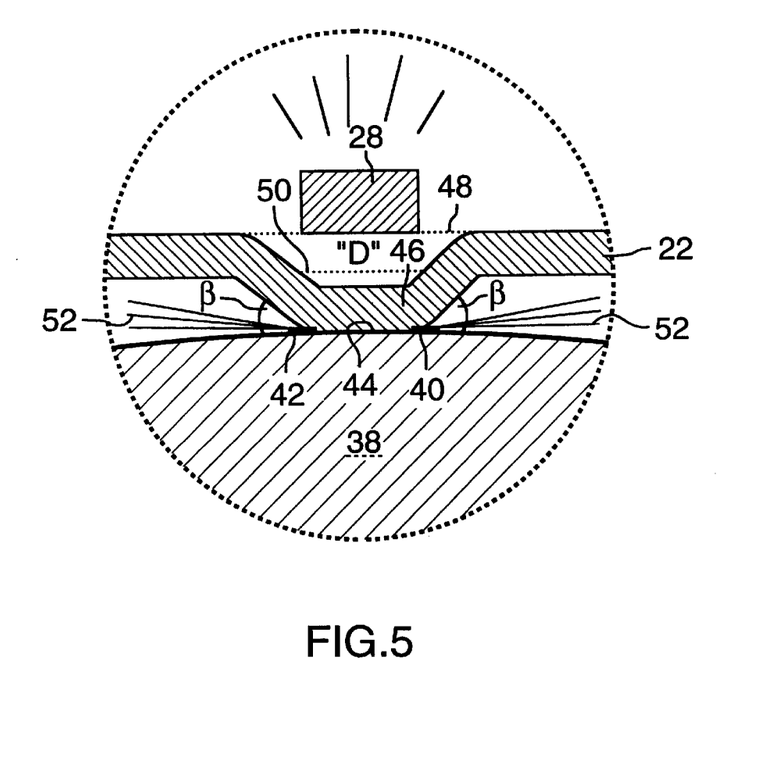
FIG. 5 represents enlarged detail A of FIG. 4.

With specific reference to FIGS. 4 and 5, these show a resultant bond shown generally as 38 having a pair of bonded portions 40, 42 separated by a non-bonded central portion or collision zone 44, resulting from propagation of portion 46 of foil 22 to pipe substrate 12 from a pre-detonation stand-off position "D" shown between dotted lines 48 and 50 by explosive 28.

A lateral jet 52 is pictorally represented to propagate under a collision angle $\beta$ of about 7° on both sides of collision zone 44, which is the zone of normal impact where neither jetting nor bonding takes place. Lateral jet 52 provides a cleaning mechanism that removes contaminants and allows a solid phase bonding phenomenon to occur at both sides 40, 42 of the normal collision zone 44.

Figure 6:
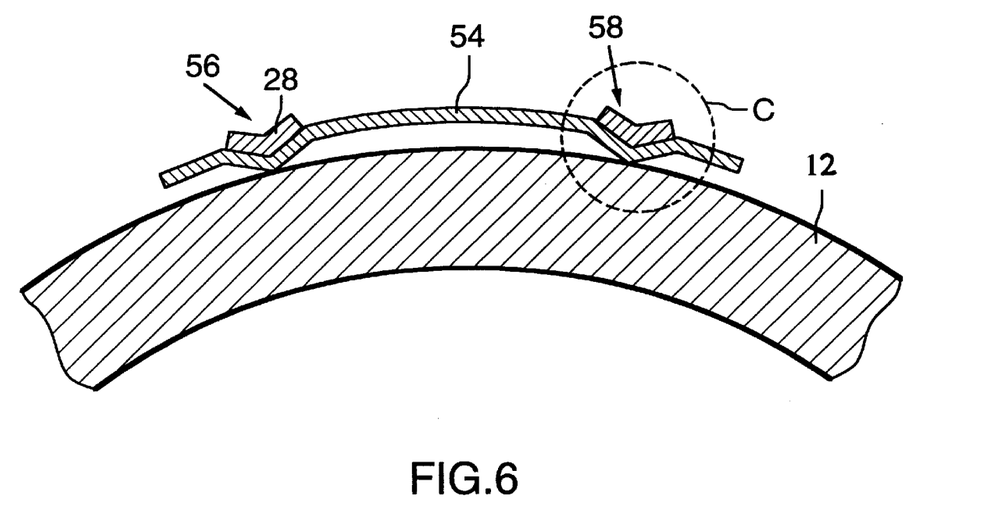
FIG. 6 represents a cross-sectional portion of assembled major components using a V-shaped foil of an alternative embodiment according to the invention.
Figure 7:
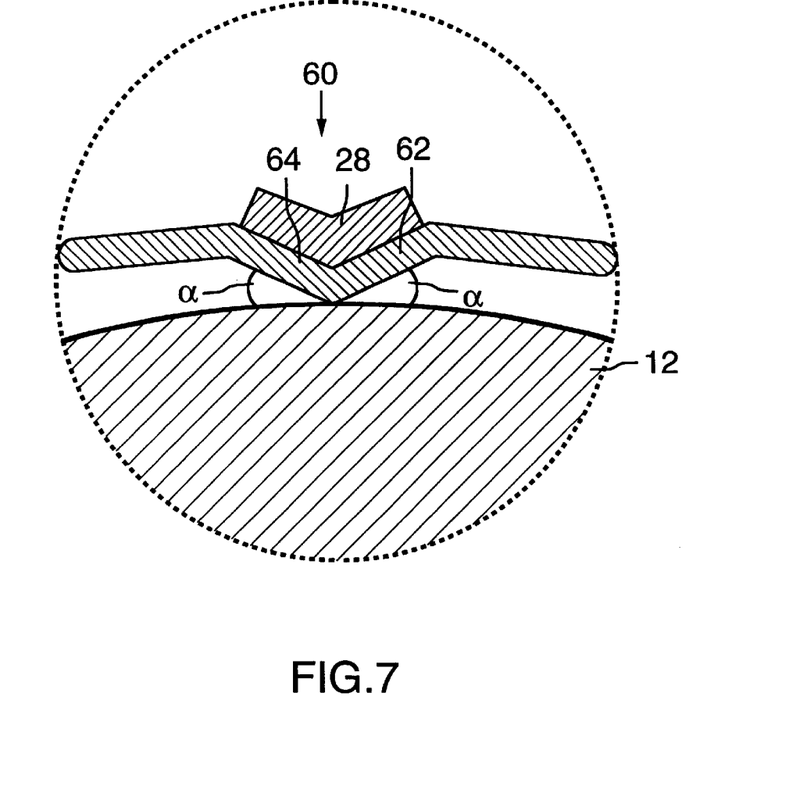
FIG. 7 is an enlarged detail "C" of a portion of FIG. 6.

In an alternative embodiment, shown in FIGS. 6 and 7, a foil 54 having cross-sectional V-portions shown generally as 56 and 58 is affixed to pipe substrate 12 without the use of a stand-off. Foil 54 is so deformed as to provide an ellipically-shaped explosive receiving pathway or channel, being V-shaped in cross-section.

Channel 60 in cross-section longitudinal of channel is V-shaped and adapted to receive high explosive strip 28 as shown in FIGS. 6 and 7 and has terminal extensions (not shown) similar to extensions 30 and 32. V-side portions 62 and 64 have a stand-off of between 0.3–3 mm and a pre-set angle $\alpha$ of 3–15°. Upon detonation, explosive 28 forces V-side portions 62 and 64 to produce a double bond as hereinabove described with reference to use of stand-off 14 and FIGS. 4 and 5.

The pre-set angle $\alpha$, on both sides of the vertex "V" may be suitably selected from the range of about 3° to about 15°, preferably, 3–10° and more preferably about 5°.

Thus, the invention provides a process of propelling a metal foil to a metal substrate such that the desired collision angle $\beta$ between the two metals is either established at a point of contact by a pre-set angle $\alpha$ prior to propagation of the explosive charge by reason of the shape of the portion of the metal foil adjacent the explosive charge, or by standing-off that portion of the foil adjacent the explosive charge and to be bonded at a suitable pre-set stand-off distance, where $\alpha=0$.

Judicious selection is made of a suitable high explosive to provide a velocity in the range 5,500–9,000 m/s, preferably 6600–7600 m/s.

In both embodiments described hereinabove, I have found that each strip of explosive charge when disposed on the foil according to the invention produces a double-bonded longitudinal seal having a non-bonded intervening portion lengthwise of the strip, to provide a continuous leak proof seal. The stand-off distance is related to the density, thickness of the foil material and welding velocity but preferably needs to be determined empirically for each set of variables to ensure good reproduceability and consistency of the strength of the double-bond.

To provide a hermetically sealed chamber, cavity or envelope according to the invention, preferably, the explosive strip defines a closed path or loop having curved, non-acute angled portions whereby the detonation front does not have to, unfavourably, change direction, drastically. Although a circular explosive propagation path meets the above preferment, such a circular path causes the front to return to its unclean initiation position, and thus, possibly provide a less than satisfactory resultant bond.

Most preferably, an elliptical or oval shaped propagation path wherein the initiation occurs at a single spot but provides a two-path, gently curved propagation layout which paths simultaneously meet at a terminus whereat the individual shock fronts gently merge at such a suitable angle as to prevent the formation of a detrimental, reinforced shock wave. The paths are preferably gently curved in the same plane as to form a dual continuous path along which each of the propagation fronts pass to exit the loop and terminate simultaneously external of the ellipse.

Such a preferred method of propagating the explosive along a two-path, front is further beneficially enhanced by providing the explosive strip of a wider width (at least 10%) than the width of the lines, in both terminuses of the ellipse. Such an enhanced width at the terminus portion encourages the front to exit the loop preferentially along the terminus.

Figure 8:
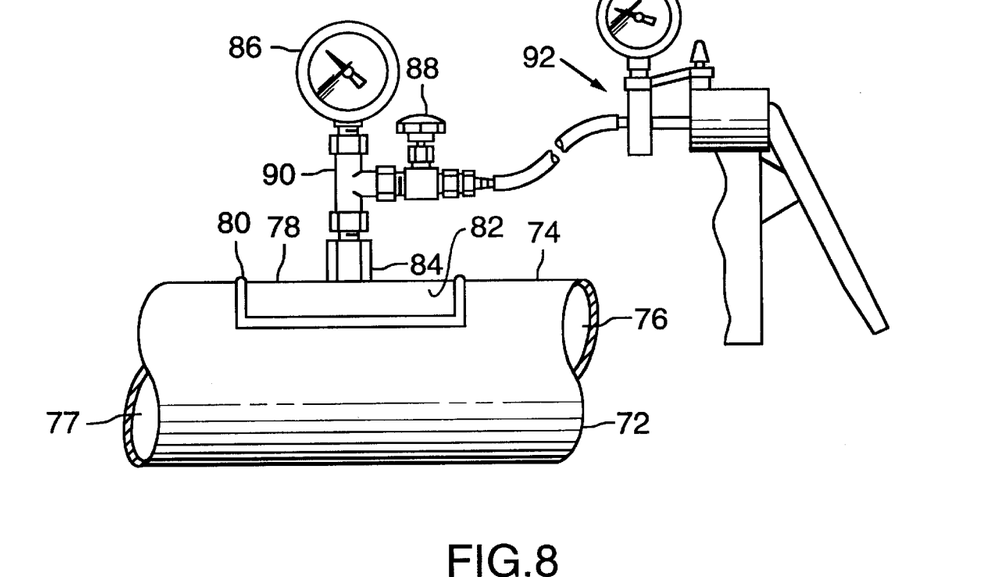
FIG. 8 represents a schematic perspective in view of a hydrogen gas monitoring apparatus according to aforesaid prior art U.S. Pat. Nos. 5,279,169 and 5,392,661 for measuring hydrogen atom diffusion through a pipe body.

With reference to FIG. 8, this shows a pipe 10 having a ferrous metal body 72 defining a first surface 74 and a second surface 76, which surface 76 is subject to corrosion by, for example, water or moisture 77.

A flexible chamber-defining member 78 is sealed by means of a surface contact adhesive 80 with first surface 74 to define a sealed chamber 82 spaced from second surface 76. Chamber defining member 78 which is attached in sealed relation to a nipple 84 connected to a vacuum gauge 86 and a flow control valve 88 through a three-way fitting 90. Flow control valve 88 is, in turn, connected to a vacuum pump 92 to define a flow path from chamber 82. Valve 88 is provided to isolate chamber 82 from pump 92 by opening and closing of the flow passage.

Figure 9:
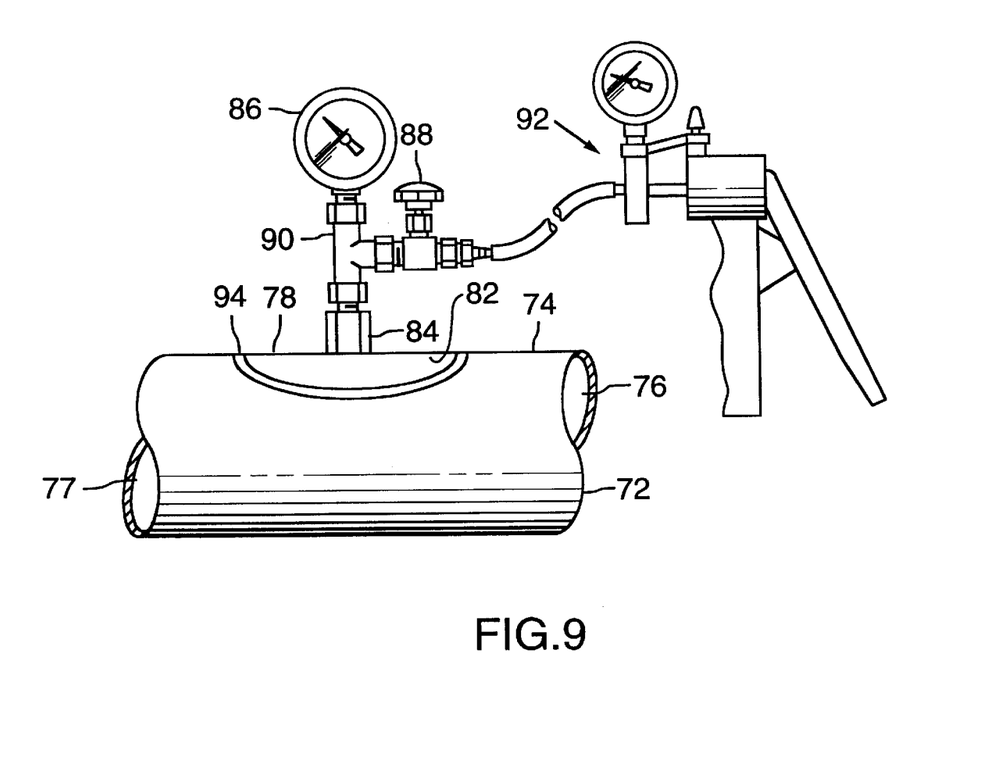
FIG. 9 represents a similar apparatus as for FIG. 8 according to the invention. and wherein the same numerals denote like parts.

FIG. 9 is according to the invention and shows a majority of the components of FIG. 8, except that adhesive 80 has been substituted with a high energy contoured heremetic seal 94.

The process of producing a hermetic seal according to the invention has many applications, for example, production of a hermetically sealed envelope with the surface of a substrate for measuring hydrogen production from corrosion processes;

sealing of an opening in a substrate, such as a ship's hull;

hermetic sealing for transportation and disposal of hazardous materials;

production of a hermetically sealed envelope, chamber or cavity, which has opening means for a pressure supply or evacuation means;

hermetic sealing by remote control.

RESULTS

The Table shows the results of several explosive bonding experiments following the practice according to the present invention or otherwise.

The results are shown as a quantitative measure on a scale of 0–5 of the quality of the high energy contoured hermetic seal.

The Table also shows the path of the explosive strip (contour), the nature of the foil and substrate and other parameters. "G" denotes that the foil had a V-shaped groove to receive the explosive charge and to provide the stand-off requirement of the foil from the substrate.

TABLE

Explosive Bonding Test Results

| Test No. | Contour Path | Explosive | Foil thickness (mm) | Stand-off Thickness (mm) | Substrate | Rating |
|---|---|---|---|---|---|---|
| 1 | linear | C1 4 mm | 0.25 A | 0.25 | F | 1 |
| 2 | linear | C1 4 mm | 0.5 A | 0.25 | F | 2 |
| 3 | linear | C1 4 mm | 0.5 A | 0.25 | F | 3 |
| 4 | linear | C1 4 mm | 0.5 S | 0.25 | F | 2 |
| 5 | linear | C1 4 mm | 0.5 S | 0 | F | 2 |
| 6 | linear | C1 4 mm | 0.25 S | 0 | F | 2 |
| 7 | linear | XT 4.23 | 0.25 S | 0 | F | 1 |
| 8 | linear | XTND 2.26 | 0.25 S | 0 | F | 1 |
| 9 | linear | XTND 2.26 | 0.5 S | 0 | F | 0 |
| 10 | linear | XTND 2.26 | 0.5 A | 0 | F | 0 |
| 11 | linear | XT 4.23 | 0.5 S | 0 | F | 2 |
| 12 | $Y_1$ | C1 4 mm | 0.5 A | 0 | F | 1 |
| 13 | $Y_1$ | XT 4.23 | 0.5 A | 0 | F | 1 |
| 14 | $Y_1$ | XT 4.23 | 0.3 S | 0 | F | 0 |
| 15 | $Y_2$ | XT 4.23 | 0.3 S | 0 | F | 1 |
| 16 | $Y_1$ | B-line 38 | 0.3 A | 0 | F | 1 |
| 17/18 | $Y_3$ | C1 4 mm | 0.3 S | 0 | F | 3 |
| 19 | oval | C1 4 mm | 0.3 S | 0 | F | 3 |
| 20 | linear | C1.5 4 mm | 0.5 S | 0 | F | 3 |
| 21 | linear | C1.5 4 mm | 0.25 S | 0 | F | 1 |
| 22 | linear | C1.5 4 mm | 0.3 S | 0 | F | 1 |
| 23 | $Y_2$ | C1.5 4 mm | 0.3 S | 0 | F | 1 |
| 24 | linear | C1.5 4 mm | 0.3 S | 0 | F | 1 |
| 25 | linear | C1.5 4 mm + C1 | 0.3 S | 0 | F | 2 |
| 26 | oval | C1 4 mm | 0.25 A | 0 | F | 1 |
| 27 | linear | C1 4 mm | 0.25 S | 0.5 | F | 4 |
| 28 | $Y_2$ | C1 4 mm | 0.3 A | 0 | F | 4 |
| 29 | oval | C1 4 mm | 0.3 A | 0 | P | 5 |
| 30 | oval | C1 4 mm | 0.3 A | 0.5 | P | 0* |
| 31 | linear | C1 4 mm | 0.3 A | 1.5 mm G | F | 5 |
| 32 | linear | C1 4 mm | 0.3 A | 1.5 mm G | F | 5 |
| 33 | linear | C1 4 mm | 0.3 A | 2.0 mm G | F | 5 |
| 34 | linear | C1 4 mm | 0.3 A | 0.3 mm G | F | 4 |
| 35 | linear | C1 4 mm | 0.3 A | 0.3 mm G | F | 4 |
| 36 | linear | C1 4 mm | 0.3 A | 2.0 mm G | F | 4 |
| 37 | oval | C1 4 mm | 0.3 A | 0.6 mm | F | 4 |
| 38 | oval | C1 4 mm | 0.3 A | 0.6 mm | F | 5 |
| 39 | oval | C1 4 mm | 0.3 A | 0.6 mm | P | 5 |
| 40 | oval | C1 4 mm | 0.3 A | 0.6 mm | $P_1$ | 3** |
| 41 | oval | C1 4 mm | 0.3 A | 0.6 mm | P | 3 |
| 42 | linear | C1 4 mm | 0.5 S | 0.75 mm | $F_1$ | 5 |
| 43 | linear | C1 4 mm | 0.5 S | 0.75 mm | $F_1$ | 5 |

TABLE-continued

Explosive Bonding Test Results

| Test No. | Contour Path | Explosive | Foil thickness (mm) | Stand-off Thickness (mm) | Substrate | Rating |
|---|---|---|---|---|---|---|
| 44 | oval | C1 4 mm | 0.3 A | 0.75 mm | $F_1$ | 5 |

Legend:
0 = poor;
5 = excellent
A = annealed stainless steel;
S = standard stainless steel
F = 1.2 cm mild steel plate
P = 15 cm diameter pipe 1.25 cm thick
P = 20 cm diameter pipe 0.9 cm thick
$F_1$ = 2.0 cm high carbon steel plate
G = V-shaped groove
$Y_1$ = Y-shaped detonation pathway with diverging arms
$Y_2$ = two Y-shaped detonation pathways oriented such that the arms form a sealed envelope
$Y_3$ = same as $Y_2$, except that each of the two Y's is detonated separately.
*During set-up, the Lexan separator piece became misaligned, and interfered with the creation of a bond (test #30).
**Oval configuration was prepared with Y-shaped diverging and conveying sections. These juncture points showed bowing of the foil section in those areas (tests #40, 41).

The results clearly show by tests #38, 39 and 41–44 that excellent bonds were formed using a stand-off distance of about 0.75 mm; and tests #31–36 using a V-shaped groove to provide a stand-off distance of about 0.3 mm–2.0 mm, having a pre-set angle a of approximately 5–15° gave very good results.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

I claim:

1. A method of producing an hermetically sealed envelope or chamber between a first metal and a second metal, said first metal comprising a first portion and a second portion, wherein said first portion has a surface defining a closed loop; said loop having a first substantially longitudinal surface and a second substantially longitudinal surface in spaced apart parallel relation to said first longitudinal surface; said loop formed with a first terminal portion and a second terminal portion in diametrically opposed relationship; said method comprising:

(a) positioning said second portion and said second metal in spaced apart relation placing an explosive along the loop formed in the first portion to form a substantially identical explosive lop;

(b) propelling said first portion into collision with said second metal so as to produce said hermetically sealed envelope or chamber between said first portion and said second metal comprising connecting a detonator to said first terminal portion of the explosive, and detonating said detonator at said first terminal portion, whereby said detonation travels said explosive loop, simultaneously along said first longitudinal surface and said second longitudinal surface to terminate in said second terminal portion.

2. A method as defined in claim 1 of producing an hermetically sealed envelope or chamber between a first metal and a second metal, said first metal comprising a first portion and a second portion, wherein said first portion has an explosive charge-receiving surface defining a closed loop; said method comprising (a) positioning said second portion and said second metal in spaced apart parallel relation;

(b) applying a layer of high velocity explosive charge having a detonation velocity selected from 5,500–9,000 m/s upon said first portion;

(c) detonating said explosive charge so as to propel said first portion into collision with said second metal so as to produce said hermetically sealed envelope or chamber between said first portion and said second metal.

3. A method as defined in claim 2 wherein said first portion defines a recess having a lower portion and adapted to receive said explosive; and further comprising positioning said lower portion in abutment with said second metal.

4. A method as defined in claim 3 wherein said first portion defines a V-shaped recess adapted to receive said explosive and comprises a pair of integrally-formed arms to provide an intervening portion between said arms where the arms come together to form the V-shaped recess; and positioning said intervening portion in abutment with said second metal to provide a pre-set angle α, selected from about 3–30°.

5. A method as defined in claim 1 wherein said positioning of said second portion and said second metal in spaced apart parallel relation is effected by positioning a stand-off plate between said second portion and said second metal.

6. A method as defined in claim 3 wherein said explosive charge-receiving surface defines an ellipse, said ellipse having a first substantially longitudinal surface and a second substantially longitudinal surface in spaced apart relation to said first longitudinal surface; said ellipse formed with a first terminal portion and a second terminal portion in diametrically opposed relationship, said method comprising connecting a detonator to said first terminal portion, and detonating said explosive charge at said first terminal portion, whereby said detonation travels said loop, simultaneously along said first longitudinal surface and said second longitudinal surface to terminate in said second terminal portion.

7. A method as defined in claim 6 wherein said first terminal and said second terminal portions are separated by a distance that is at least 10% greater than the width of said closed loop.

8. A method as defined in claim 1 wherein said second metal defines a tube, and said first metal has a portion defining an aperture adapted to receive gas pressure measuring means.

* * * * *